United States Patent
Parsche

(10) Patent No.: US 9,081,116 B2
(45) Date of Patent: Jul. 14, 2015

(54) SUBTERRANEAN MAPPING SYSTEM INCLUDING SPACED APART ELECTRICALLY CONDUCTIVE WELL PIPES AND RELATED METHODS

(71) Applicant: Harris Corporation, Melbourne, FL (US)

(72) Inventor: Francis E. Parsche, Palm Bay, FL (US)

(73) Assignee: HARRIS CORPORATION, Melbourne, FL (US)

(*) Notice: Subject to any disclaimer, the term of this patent is extended or adjusted under 35 U.S.C. 154(b) by 437 days.

(21) Appl. No.: 13/711,147

(22) Filed: Dec. 11, 2012

(65) Prior Publication Data

US 2014/0159939 A1 Jun. 12, 2014

(51) Int. Cl.
*G01S 13/89* (2006.01)
*G01V 3/12* (2006.01)
*G01V 3/30* (2006.01)
*E21B 47/022* (2012.01)

(52) U.S. Cl.
CPC ............ *G01V 3/30* (2013.01); *E21B 47/02216* (2013.01)

(58) Field of Classification Search
CPC ........................... G01V 3/30; E21B 47/02216
USPC ............................... 342/22, 27, 179–180, 191
See application file for complete search history.

(56) References Cited

U.S. PATENT DOCUMENTS

| | | | |
|---|---|---|---|
| 4,257,482 A | 3/1981 | Kompanek | |
| 4,651,044 A | 3/1987 | Kompanek | |
| 4,945,305 A | 7/1990 | Blood | |
| 5,740,125 A * | 4/1998 | Chon et al. | 367/75 |
| 6,097,189 A | 8/2000 | Arndt et al. | |
| 6,175,536 B1 * | 1/2001 | Khan | 367/32 |
| 6,252,396 B1 | 6/2001 | Arndt et al. | |
| 6,628,118 B1 | 9/2003 | Amini | |
| 6,657,440 B1 | 12/2003 | Amini | |
| 7,450,053 B2 | 11/2008 | Funk et al. | |
| 7,598,898 B1 | 10/2009 | Funk et al. | |
| 7,677,673 B2 | 3/2010 | Tranquilla et al. | |
| 7,770,469 B2 | 8/2010 | Nyfors et al. | |
| 7,812,610 B2 | 10/2010 | Clark et al. | |
| 7,842,313 B2 | 11/2010 | Pound et al. | |
| 7,960,969 B2 | 6/2011 | Mouget et al. | |
| 7,980,327 B2 | 7/2011 | Benischek et al. | |
| 8,038,616 B2 | 10/2011 | Angelsen et al. | |
| 8,763,692 B2 * | 7/2014 | Parsche | 166/248 |
| 2008/0235280 A1 * | 9/2008 | Schoen et al. | 707/104.1 |
| 2009/0302851 A1 | 12/2009 | Bittar et al. | |
| 2010/0194587 A1 * | 8/2010 | Weerasinghe | 340/854.9 |
| 2012/0029827 A1 * | 2/2012 | Pepper et al. | 702/16 |
| 2013/0193975 A1 * | 8/2013 | Qu et al. | 324/351 |
| 2013/0204534 A1 * | 8/2013 | Anand et al. | 702/11 |

(Continued)

*Primary Examiner* — John B Sotomayor
(74) *Attorney, Agent, or Firm* — Allen, Dyer, Doppelt, Milbrath & Gilchrist, P.A.

(57) ABSTRACT

A subterranean mapping system may include a pair of spaced electrically conductive well pipes in a subterranean formation containing a hydrocarbon resource. The pair of electrically conductive well pipes may include a fluid inlet pipe and a fluid outlet pipe. The subterranean mapping system may further include a radiofrequency (RF) source coupled to the pair of electrically conductive well pipes to generate an electromagnetic (EM) field in the subterranean formation. The subterranean mapping system may further include a subterranean mapping device configured to be carried along with a fluid flow along a path of travel from the fluid inlet pipe to the fluid outlet pipe and while sensing the EM field versus time.

20 Claims, 9 Drawing Sheets

(56) References Cited

U.S. PATENT DOCUMENTS

| | | | |
|---|---|---|---|
| 2014/0041862 A1* | 2/2014 | Ersoz | 166/250.1 |
| 2014/0052377 A1* | 2/2014 | Downie | 702/11 |
| 2014/0159939 A1* | 6/2014 | Parsche | 342/22 |
| 2014/0159940 A1* | 6/2014 | Parsche | 342/22 |

* cited by examiner

SUBTERRANEAN MAPPING SYSTEM INCLUDING SPACED APART ELECTRICALLY CONDUCTIVE WELL PIPES AND RELATED METHODS

FIELD OF THE INVENTION

The present invention relates to the field of hydrocarbon resource processing, and, more particularly, to hydrocarbon resource processing including mapping.

BACKGROUND OF THE INVENTION

A hydrocarbon resource may be particularly valuable as a fuel, for example, gasoline. One particular hydrocarbon resource, bitumen, may be used as a basis for making synthetic crude oil (upgrading), which may then be refined into gasoline.

One technique for recovering a hydrocarbon resource may be the steam assisted gravity drainage (SAGD) process. In the SAGD process, two parallel horizontal oil wells are drilled in a subterranean formation, one about 4 to 6 meters above the other. The upper well injects steam, possibly mixed with solvents, and the lower one collects the heated crude oil or bitumen that flows out of the subterranean formation, along with any water from the condensation of injected steam. The basis of the process is that the injected steam forms a "steam chamber" that grows vertically and horizontally in the subterranean formation.

The heat from the steam reduces the viscosity of the heavy crude oil or bitumen, which allows it to flow down into the lower wellbore. The steam and gases rise because of their low density compared to the heavy crude oil below so that steam is not produced at the lower production well. Oil and water flow is by a countercurrent, gravity driven drainage into the lower well bore. The condensed water and crude oil or bitumen is recovered to above the subterranean formation by pumps.

In some instances, a wormhole may form in an undesirable location in the subterranean formation between the upper and lower wellbores. The wormhole may reduce the amount of the hydrocarbon resource recovered, and/or may reduced efficiency of the hydrocarbon recover process. Accordingly, it may be desirable to map a wormhole in the subterranean formation, for example, for the purposes of repair.

One technique for mapping a wormhole may include using a global positioning system (GPS) tracking device to be inserted into the one of the upper and lower wellbore. However, the GPS tracking device may not provide accurate position information underground as ultra-high frequency (UHF), 1575 Mhz GPS signals generally do not penetrate or reach into the subterranean formation.

Other subterranean locating techniques, for example, for locating adjacent wellbores, may include using driving electric current. U.S. Pat. No. 7,812,610 to Clark et al. discloses a method for locating well casings from an adjacent wellbore. More particularly, Clark et al. discloses a wellbore tool for locating a target wellbore containing a conductive member from a second wellbore and directing the trajectory of the second wellbore relative to the target wellbore. The wellbore tool includes an electric current driver having an insulated gap and at least one magnetometer positioned above or below the electric current driver. The electric current driver generates an electric current across the gap to the portions of the tool above and below the insulated gap.

Further improvements to mapping or tracking in a subterranean formation may be desirable. For example, it may be desirable to more quickly and easily map a wormhole, to more quickly repair a well and increase hydrocarbon resource recovery, for example.

SUMMARY OF THE INVENTION

In view of the foregoing background, it is therefore an object of the present invention to increase the efficiency of hydrocarbon resource recovery by mapping a subterranean formation for example, for a wormhole.

This and other objects, features, and advantages in accordance with the present invention are provided by a subterranean mapping system that includes a pair of spaced electrically conductive well pipes in a subterranean formation containing a hydrocarbon resource. The pair of electrically conductive well pipes also includes a fluid inlet pipe and a fluid outlet pipe. The subterranean mapping system further includes a radiofrequency (RF) source coupled to the pair of electrically conductive well pipes to generate an electromagnetic (EM) field in the subterranean formation. The subterranean mapping system also includes a subterranean mapping device configured to be carried along with a fluid flow along a path of travel from the fluid inlet pipe to the fluid outlet pipe and while sensing the EM field versus time. Accordingly, the subterranean mapping system may be particularly useful for finding wormholes, and thus increase the efficiency of hydrocarbon resource recovery.

The subterranean mapping system may further include a controller to be coupled to the subterranean mapping device and configured to map the path of travel based upon the EM field. The subterranean mapping device may include a portable housing and a plurality of antennas carried by the portable housing. The subterranean mapping device may further include a receiver coupled to the plurality of antennas and configured to sense a plurality of phase and amplitude components of the EM field. A memory may be coupled to the receiver and may be configured to store the plurality of phase and amplitude components, for example.

A method aspect is directed to a method of a mapping a path of travel of a subterranean mapping device in a subterranean formation containing a hydrocarbon resource and having a pair of spaced electrically conductive well pipes therein, the pair of electrically conductive well pipes including a fluid inlet pipe and a fluid outlet pipe. The method includes supplying radiofrequency (RF) energy from an RF source coupled to the pair of electrically conductive well pipes to generate an electromagnetic (EM) field in the subterranean formation. The method also includes advancing the subterranean mapping device along with a fluid flow along the path of travel from the fluid inlet pipe to the fluid outlet pipe and while sensing the EM field versus time.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple notation is used to indicate similar elements in alternative embodiments.

Figure 1:
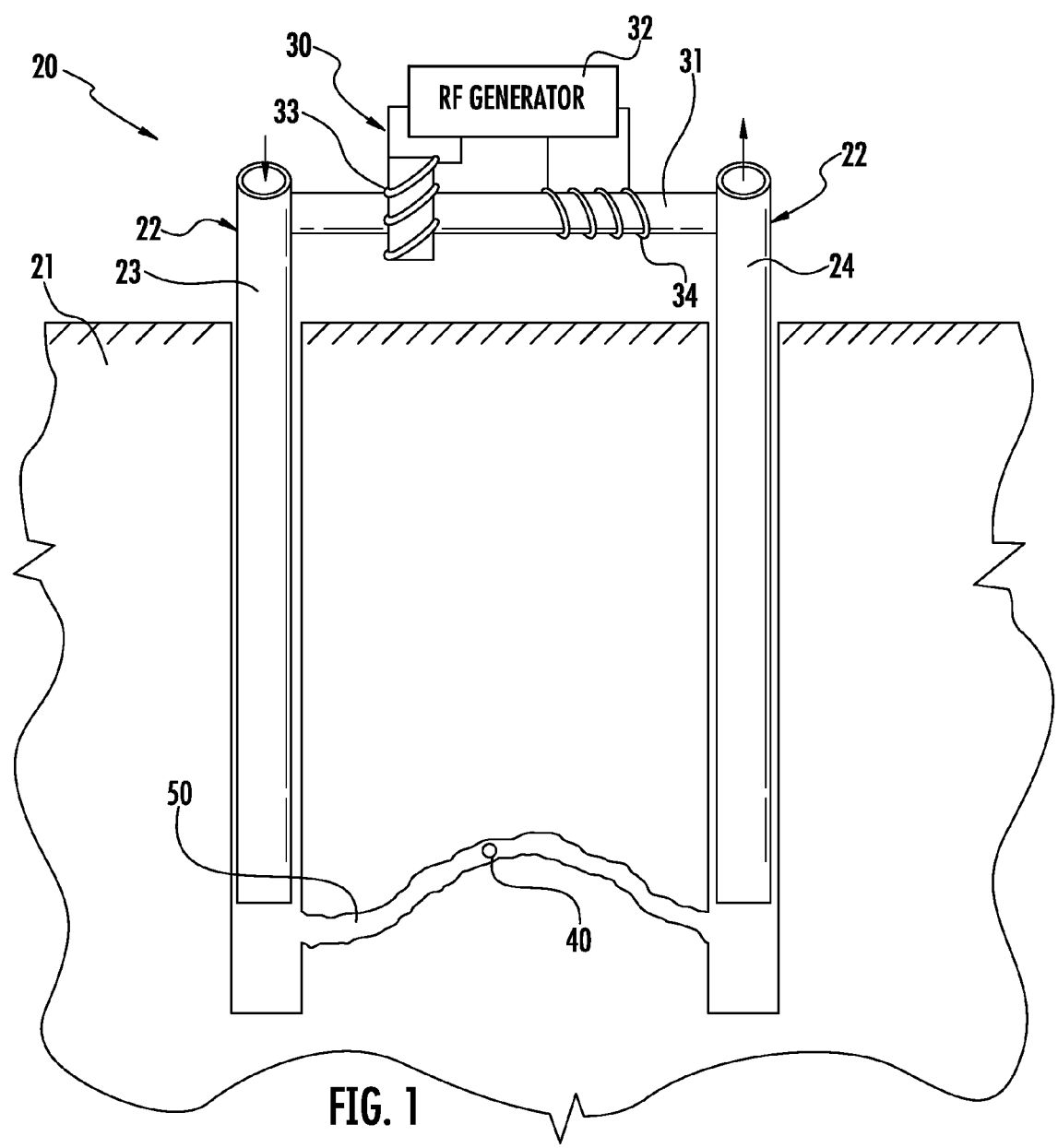
FIG. 1 is a schematic cross-sectional view of a subterranean formation including a subterranean mapping system in accordance with the present invention.

Referring initially to FIG. 1, a subterranean mapping system 20 includes a pair of spaced apart electrically conductive well pipes 22 in a subterranean formation 21 containing a hydrocarbon resource. The pair of spaced apart electrically conductive well pipes 22 may be carbon steel, for example, or may other conductive materials. The spaced apart electrically conductive well pipes 22 may be well pipes in a SAGD well system, and may extend laterally.

The pair of electrically conductive well pipes 22 includes a fluid inlet pipe 23 and a fluid outlet pipe 24. For example the fluid inlet pipe 23 may be an injector well, and the fluid outlet pipe 24 may be a producer well.

The subterranean mapping system 20 also includes a radiofrequency (RF) source 30 coupled to the pair of electrically conductive well pipes 22 to generate an electromagnetic (EM) field in the subterranean formation 21. The RF source 30 is illustratively above the subterranean formation. In some embodiments, the RF source 30 may be within the subterranean formation.

The RF source 30 includes a shunt 31 coupled between the pair of electrically conductive well pipes 22. The shunt 31 may be in the form of a steel pipe, for example, and is advantageously a temporary E and H field shunt. In other words, the shunt 31 is electrically conductive and magnetically permeable.

The RF source 30 also includes an RF generator 32 coupled to the shunt 31. The RF generator 32 may be configured to generate RF energy at a frequency that may be at or below 1 MHz, and more particularly at or below 10 kHz, for example, or even relatively close to DC.

A transformer 33 is coupled between the RF generator 32 and the shunt 31. The transformer 33 may be a toroidal transformer, for example, as described in application Ser. No. 12/839,927, assigned to the present assignee, and the entire contents of which are herein incorporated by reference. The transformer 33 excites electric currents on the shunt 31 and the pair of spaced apart electrically conductive well pipes 22, and thus causes E-fields in the subterranean formation 21 (i.e., the electric field component of the EM field).

An electrically conductive winding 34 is coupled between the RF generator 32 and the shunt 31. The electrically conductive winding 34 may be a helical, spirally wound electrically conductive winding, for example, and spirally wound around the shunt 31. The electrically conductive winding 34 advantageously generates an H-field in the subterranean formation 21 (i.e. the magnetic field component of the EM field) by causing an H field in the shunt 31. The combination of the electrically conductive well pipes 22, the shunt 31, and the electrically conductive winding 34, forms, in a sense, a giant horseshoe electromagnet with the subterranean formation 21. The above-noted combination conveys electric and magnetic near fields over a relatively large area in the subterranean formation 21.

The transformer 33 and the electrically conductive winding 34 also are relatively uncoupled from one another, even though they are located on the same shunt 31. This is advantageous as two separate radiolocation channels are available. The electrically conductive well pipes 22 may be considered, at times, a horseshoe magnet, and at other times an electrode pair, depending on whether a helical or toroidal winding is excited on the shunt 31. The type of winding, helical or toroidal, determines whether electric currents or magnetic fields are applied to the electrically conductive well pipes 22.

In operation, the pair of electrically conductive well pipes 22 are excited to carry electric currents and magnetic fields, which cause electric and magnetic near fields to surround the electrically conductive well pipes defining an antenna. As will be appreciated by those skilled in the art, the electrically conductive well pipes 22 convey magnetic fields across the underground gap between the ends thereof in the subterranean formation. At the underground gap, electric fields are created, and the magnetic near fields are time harmonic. Thus, a magnetic antenna is formed, and unlike conventional electric current antennas, each point in space has a unique combination of E-field amplitude, magnetic field amplitude H, and phase.

The subterranean mapping system 20 also includes a subterranean mapping device 40. The subterranean mapping device 40 is configured to be carried along with a fluid flow along a path of travel from the fluid inlet pipe 23 to the fluid outlet pipe 24 and while sensing the EM field versus time.

Figure 2:
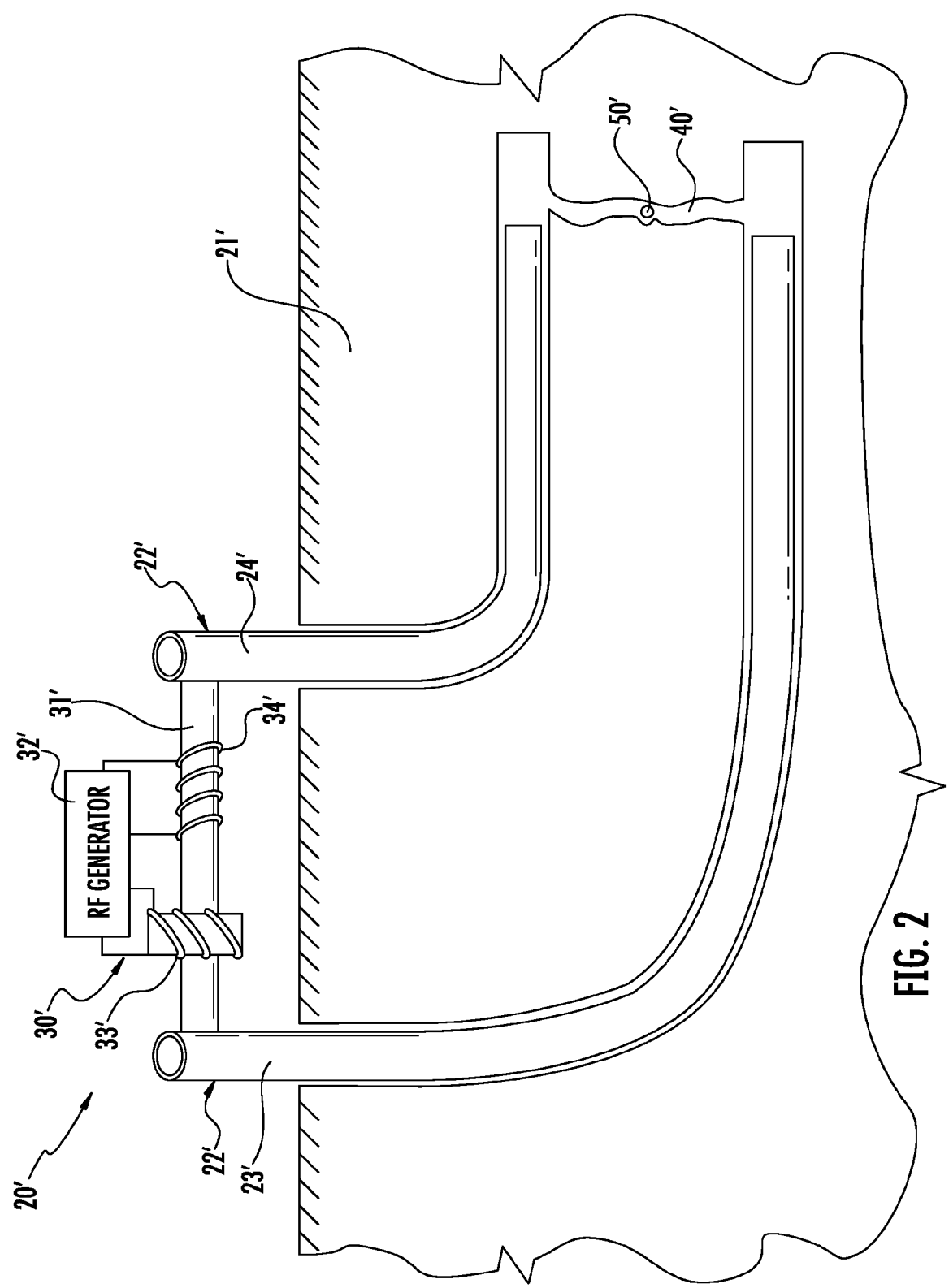
FIG. 2 is a schematic cross-sectional view of a subterranean formation including a subterranean mapping system in accordance with another embodiment of the present invention.

Referring briefly to FIG. 2, in another embodiment, the pair of electrically conductive well pipes 22' extends laterally within the subterranean formation 21'. This configuration may be particularly advantageous for use with the steam assisted gravity drainage (SAGA) technique.

Figure 3:
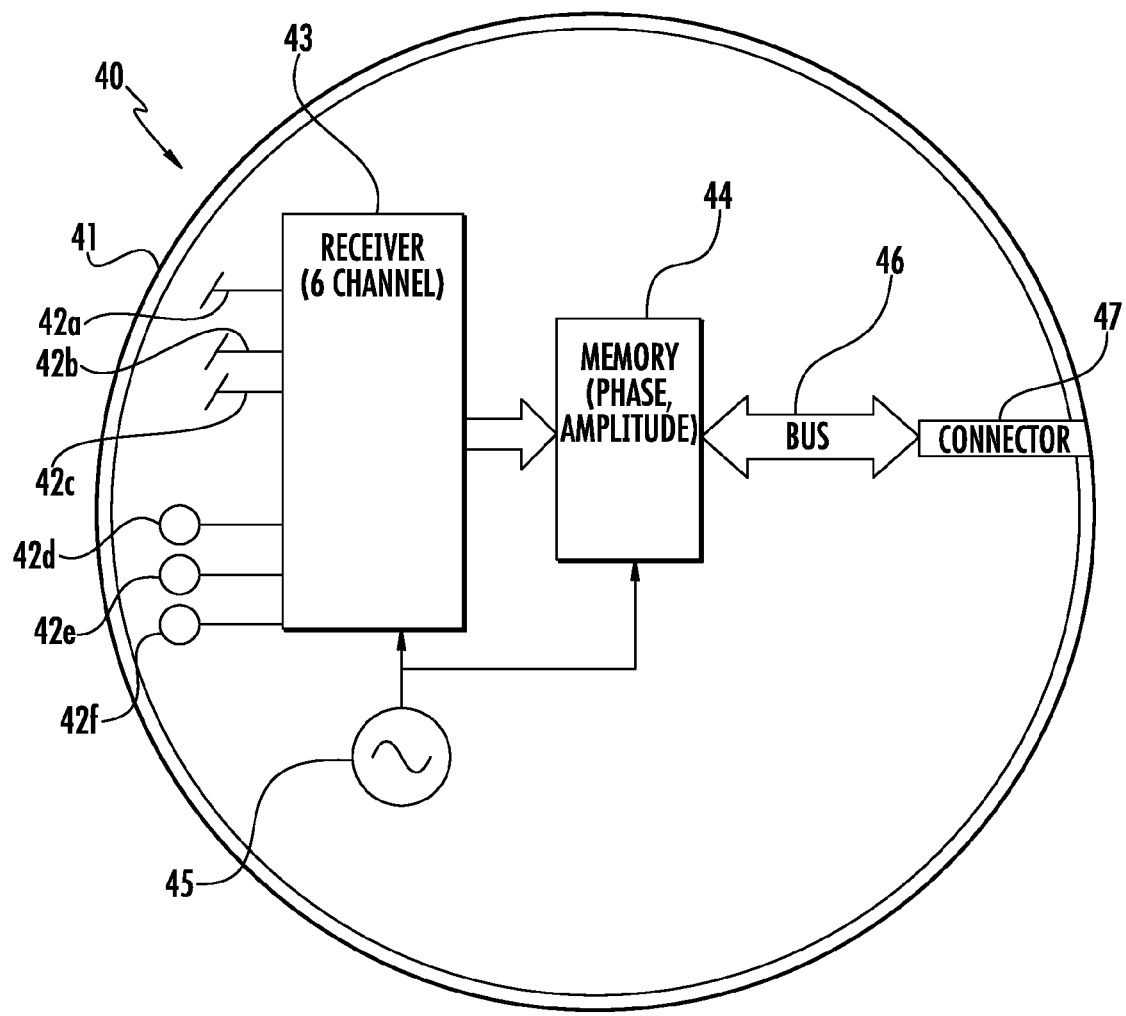
FIG. 3 is a schematic diagram of a subterranean mapping device of FIG. 1.
Figure 4:
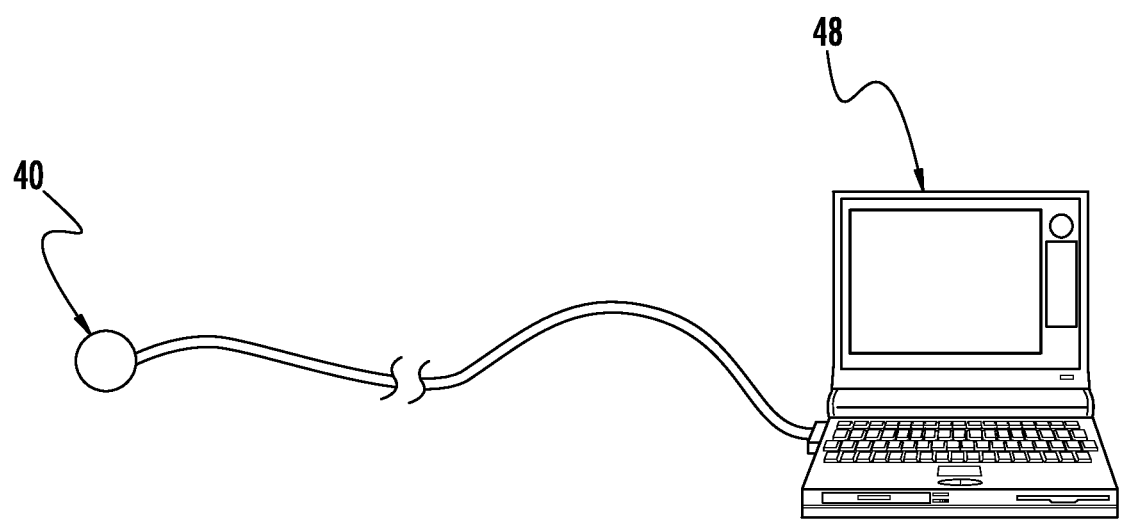
FIG. 4 is a schematic diagram of the subterranean mapping device coupled to a controller in accordance with the present invention.

Referring now additionally to FIGS. 3 and 4, the subterranean mapping device 40 includes a portable housing 41. The portable housing 41 may be spherically shaped, for example, to facilitate carrying by fluid flow. Antennas 42 are carried by the portable housing. The antennas 42 are phase centered and orthogonally mounted. Three antennas 42a, 42b, 42c, are X, Y, and Z axis dipole antennas, respectively. Three other antennas 42d, 42e, 42f are XY, YZ, and ZX plane loop antennas. In other words, the phase centered dipole and loop antennas resolve the E and H fields, respectively.

A receiver 43 is coupled to the plurality of antennas 42. The receiver 43 is illustratively a 6-channel receiver and is configured to sense a plurality of phase and amplitude components of the electric and magnetic fields from each of the antennas 42. Additional channels may be desired. A reference oscillator 45 is coupled to the receiver 43. The reference oscillator 45 may be a quartz oscillator, for example. The receiver 43 may also include a gravimeter or inclinometer to sense receiver orientation.

A memory 44 is coupled to the receiver 43 and is configured to store the phase and amplitude components along with a time stamp. In other words, the electric and the magnetic filed amplitude and phase are recorded over time, so that underground electric and magnetic fields are mapped. In some embodiments, the electrically conductive winding 34 and the transformer 32 may be operated at different times or frequencies so two separate field sets are available for mapping and underground sensing. The memory 44 logs the absolute antenna phase relative to the reference oscillator 45. More particularly, the memory 44 logs the E to H phase difference and absolute phase relative to time t=0. Advantageously, no bandwidth is being used, no pulses are generated, and no time of arrival techniques are used. The low frequencies for underground propagation generally preclude broad bandwidths for narrow pulses for time of arrival radiolocation.

The subterranean mapping device 40 also includes a digital data bus 46 connecting the memory 44 to an output connector 47. The output connector 46 may couple to a coupling cable 49, which in turn couples to the subterranean mapping device 40 to a controller 48, which may be in the form of a computer for extraction and processing of the recorded data, for example (FIG. 4). In some embodiments, the recorded data may be wirelessly transmitted to the computer 48.

The data extracted from or recorded in the memory 44 is compared to a simulated expected path of travel based upon a modelling of the pair of electrically conductive well pipes 22 and the shunt 31 (i.e. near field contours of the E and H fields). More particularly, expected E and H values corresponding to amplitude and phase are generated based upon the simulation. The actual recorded phase and amplitude components, i.e. the EM field, are compared by the controller 48 to the simulated amplitude and phase components to map or determine the path of travel.

This information may be particularly useful for determining a location of a wormhole 50 in the subterranean formation 21 (FIG. 1). As will be appreciated by those skilled in the art, a wormhole can reduce an amount of hydrocarbon resources collected, and decrease efficiency of the recovery. By determining the location of the wormhole 50, a repair may be performed more quickly and efficiently.

Applying magnetic field and electric currents to the pair of electrically conductive well pipes 22 produces, at each point in the subterranean formation 21, a unique set of the electric and magnetic near fields, the amplitudes and phases of which are used by the subterranean mapping device 40 to map its position. The bandwidth used is zero as pulse or time of arrival techniques are not needed, which may allow frequencies below 1 kilohertz to be utilized. At these frequencies, which constitute a low frequency window, electromagnetic energy may advantageously penetrate hundreds of meters or more into the subterranean formation 21.

Figure 5:
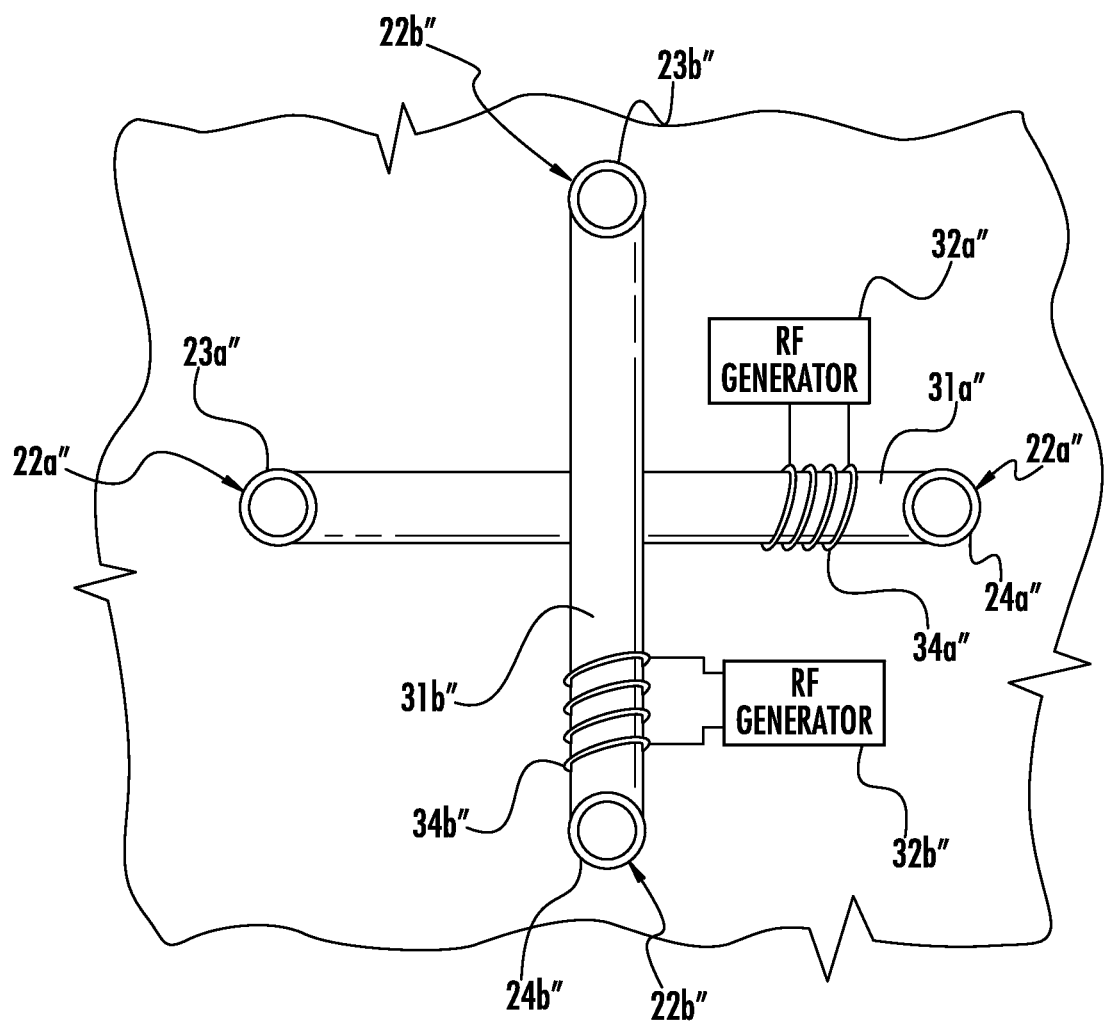
FIG. 5 is a schematic top view of subterranean formation including a portion of a subterranean mapping system in accordance another embodiment of the present invention.

Referring now to FIG. 5, in another embodiment, principles of the subterranean mapping system that apply to a pair of electrically conductive well pipes may similarly apply to two pairs of electrically conductive well pipes 22a", 22b". Each pair of electrically conductive well pipes 22a", 22b" includes respective RF source 30a", 30b" including a respective shunt 31a", 31b" and an RF generator 32a", 32b" coupled thereto, along with an electrically conductive winding 34a", 34b" as described in detail above. A respective transformer may also be coupled to each RF generator 32a", 32b". The two pairs of electrically conductive well pipes 22a", 22h" are positioned 90° out of phase from each other. This setup may advantageously result in increased accuracy mapping.

Figure 6:
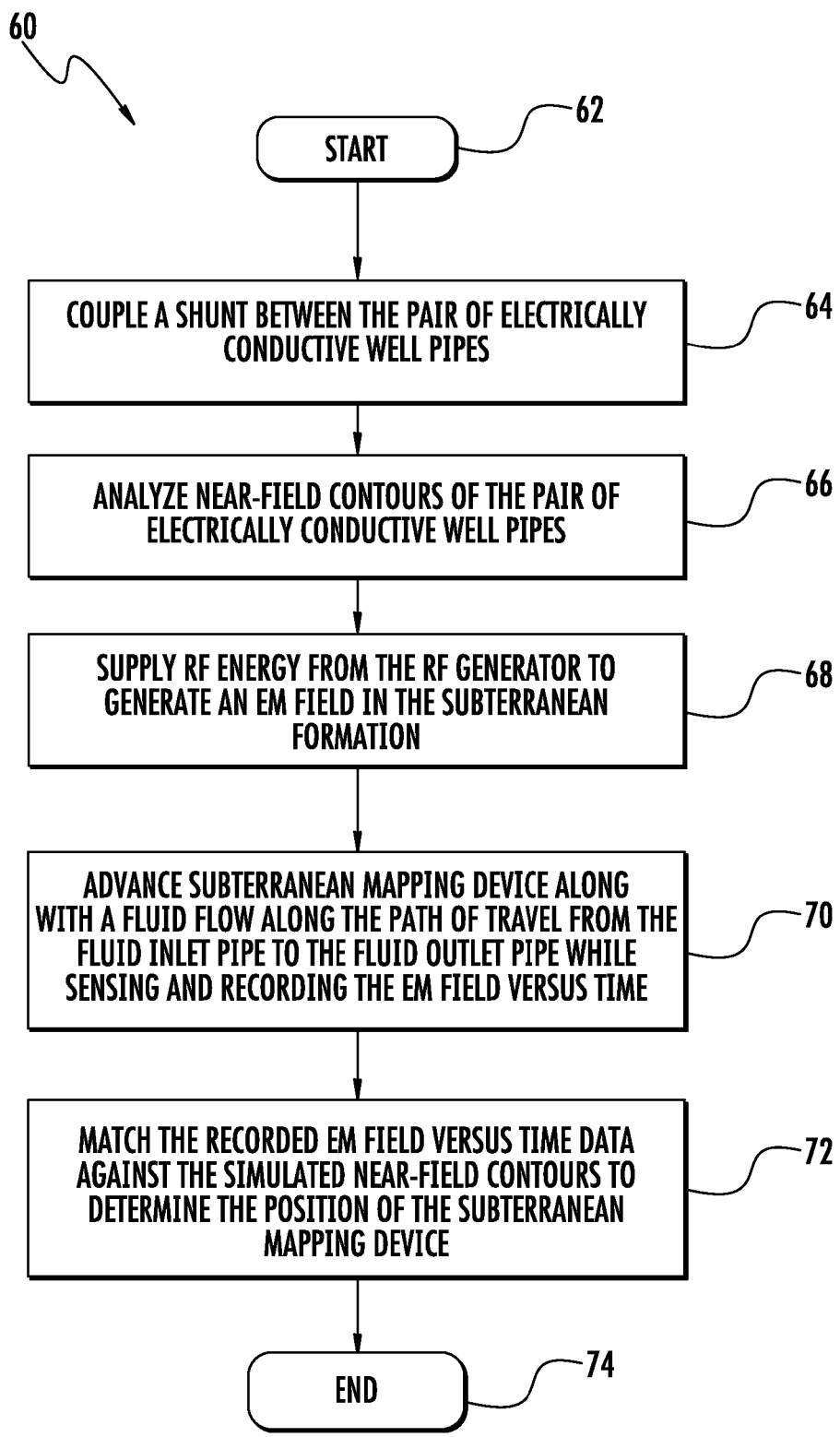
FIG. 6 is a flow chart of a method of mapping a path of travel in accordance with the present invention.

Referring now to the flowchart 60 in FIG. 6, a method aspect is directed to a method of a mapping a path of travel of a subterranean mapping device 20 in a subterranean formation 21 containing a hydrocarbon resource and having a pair of spaced electrically conductive well pipes 22 therein. The pair of electrically conductive well pipes 22 includes a fluid inlet pipe 23 and a fluid outlet pipe 24. Starting at Block 62, the method includes coupling a shunt 31 between the pair of electrically conductive well pipes 22 (Block 64). An RF generator 32 is also coupled to the shunt 31, and a transformer 33 is coupled to the between the RF generator and the shunt. An electrically conductive winding 34 is also coupled between the RF generator 32 and the shunt 31.

At Block 66, the near-field contours of the pair of electrically conductive well pipes 22 are analyzed via simulation. At Block 68, radiofrequency (RF) energy is supplied from the RF generator 32 to generate an electromagnetic (EM) field in the subterranean formation 21. A subterranean mapping device 50 is advanced, at Block 70, along with a fluid flow along the path of travel from the fluid inlet pipe 23 to the fluid outlet pipe 24 and while sensing the EM field versus time. More particularly, as noted above, the subterranean mapping device 50 records the parameters of time, E-field amplitude, H-field amplitude, E-to-H field difference, and absolute phase relative to time, t=0. At Block 72, the method includes matching the recorded tag data or parameters against the simulated near-field contours of the pair of well pipes 22. A best match may be equivalent to the position of the subterranean mapping device 50 at the given time, t. The method ends at Block 74.

Figure 7:
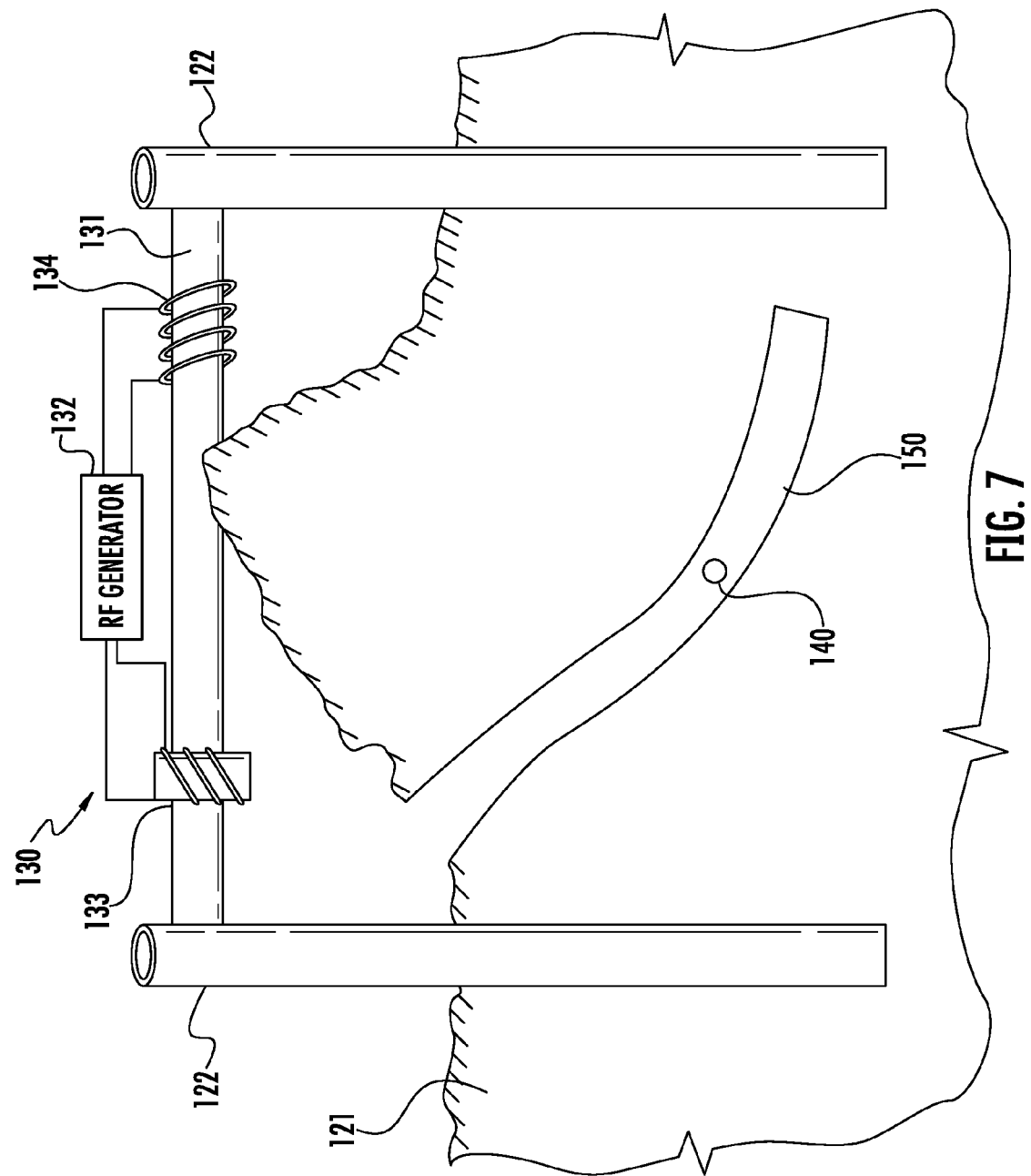
FIG. 7 is a schematic cross-sectional view of a subterranean formation including a subterranean mapping system in accordance another embodiment of the present invention.

Referring now to FIG. 7, in another embodiment, the principles described above may be particularly advantageous for underground mapping operations, for example, for search and rescue. More particularly, the subterranean mapping system 120 may be particularly useful for mapping humans in a subterranean passageway. For example, the subterranean mapping system 120 may be used for tracking miners in a mine, for example, a coal mine or a cave.

The subterranean mapping system 120 includes a pair of electrically conductive elements 122 that are rigid and that may be driven, via drilling for example, into the subterranean formation 121 adjacent the subterranean passageway 150. The electrically conductive elements 122 may be electrically conductive pipes, for example, as described above with respect to FIGS. 1-5. In other embodiments, the electrically conductive elements 122 may be wires, for example, steel wire, and may be fed down respective holes in the subterranean formation 121, or even stretched horizontally on the surface. An RF source 130 is coupled to the electrically conductive elements 122 so the subterranean passageway 150 is between the electrically conductive elements. Similar to the embodiments described above, the RF source 130 includes a shunt 131, and an RF generator coupled to the shunt. The RF source 130 also includes a transformer coupled between the shunt 131 and the RF generator 132, and an electrically conductive winding also coupled between the shunt and the RF generator.

A human, for example, a mine worker, may carry a subterranean mapping device 140 along a path of travel within the subterranean passageway 150. The E and H fields are recorded by the subterranean mapping device 140, and may be recorded or wirelessly transmitted to a controller or computer above the subterranean formation 121 by, for example, a UHF radio repeater chain.

Similar to the embodiments described above with respect to FIGS. 1-5, the recorded data may be compared to simulated data to determine or map the path of travel. This may be particularly advantageous for more quickly locating a human in a search and rescue operation, for example. Of course, locating or mapping the path of travel of the human may be particularly advantageous for other applications, as will be appreciated by those skilled in the art. This technique may also be applied to other operations where mapping of a passageway in a subterranean formation may be desired.

Figure 8:
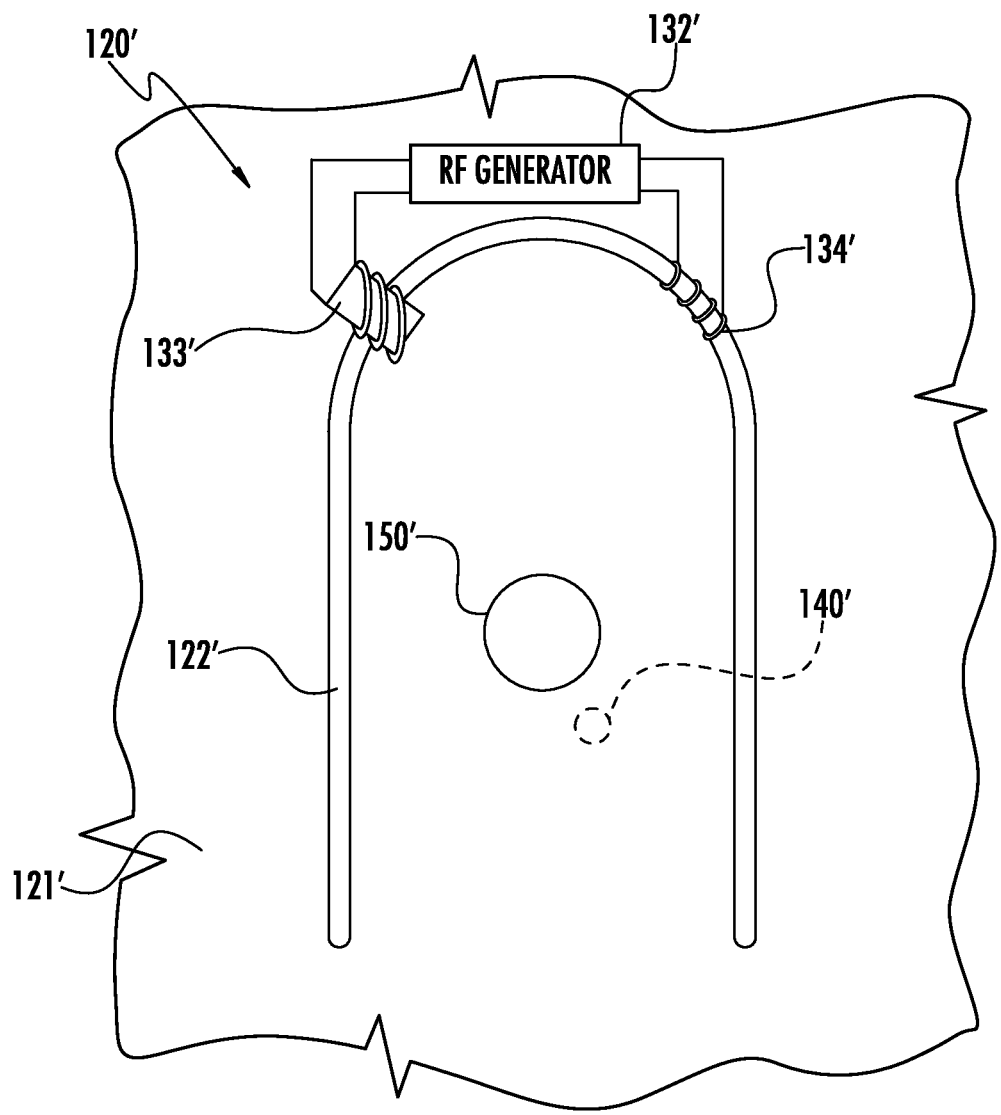
FIG. 8 is a schematic top view of a subterranean formation including a subterranean mapping system in accordance another embodiment of the present invention.

Referring now to FIG. 8, in another embodiment, an electrically conductive element 122' is carried by the subterranean formation 121'. More particularly, the electrically conductive element 122' lies flat along the surface of the subterranean formation 121' or the ground in a U-shape or horseshoe shape. The electrically conductive element 122' may be wire, for example, copper wire. The length of the electrically conductive element 122' may be in a range of about 200-300 meters, for example. Of course, the length of the electrically conductive element 122' may be another length, for example, based upon the desired area of the subterranean formation 121' to be mapped. The electrically conductive element 122' is positioned so that a subterranean passageway 150' is within the arms of the U-shape. An RF source 130' is coupled to the electrically conductive element 122' so that an EM field is generated in the subterranean formation 121'. More particularly, an RF generator 131' is coupled to the electrically conductive element 122'. A transformer 133' is coupled between the RF generator 131' and the electrically conductive element 122', and an electrically conductive winding 134' is coupled between the RF generator and the electrically conductive element. The subterranean mapping device 140' is similar to that described above, and the principles of operation also described above, are similarly applicable to this embodiment.

A related method is directed to a method of a mapping a path of travel of a subterranean mapping device 140 in a subterranean formation 121 having a passageway 150 therethrough, and having at least one electrically conductive element 122 associated therewith. The method includes supplying RF energy from an RF source 130 coupled to the at least one electrically conductive element 122 to generate an electromagnetic (EM) field in the subterranean formation 121. The method also includes advancing the subterranean mapping device 140 along the path of travel within the passageway 150 while sensing the EM field versus time.

The penetration of electromagnetic fields in a subterranean formation 121 is related to the radio frequency skin depth in the subterranean formation. Athabasca oil sand formation overburden may have a varying electrical conductivity between about 0.1 and 0.5 mhos per meter, and for 0.2 meters electrical conductivity the radio frequency skin depth can be calculated to be 356 meters at 10 hertz. Rich Athabasca oil sand proper may have an electrical conductivity of 0.005 mhos/meter, which may correspond to a radio frequency skin depth of about 356 meters at 1000 Hertz. So, overburden rather than payzone conductivity may primarily determine the operating frequency. As many such deposits are within 500 meters of the surface, operating frequencies for the present embodiments may be between about 0.5 and 500 hertz, for example, for this resource.

Figure 9:
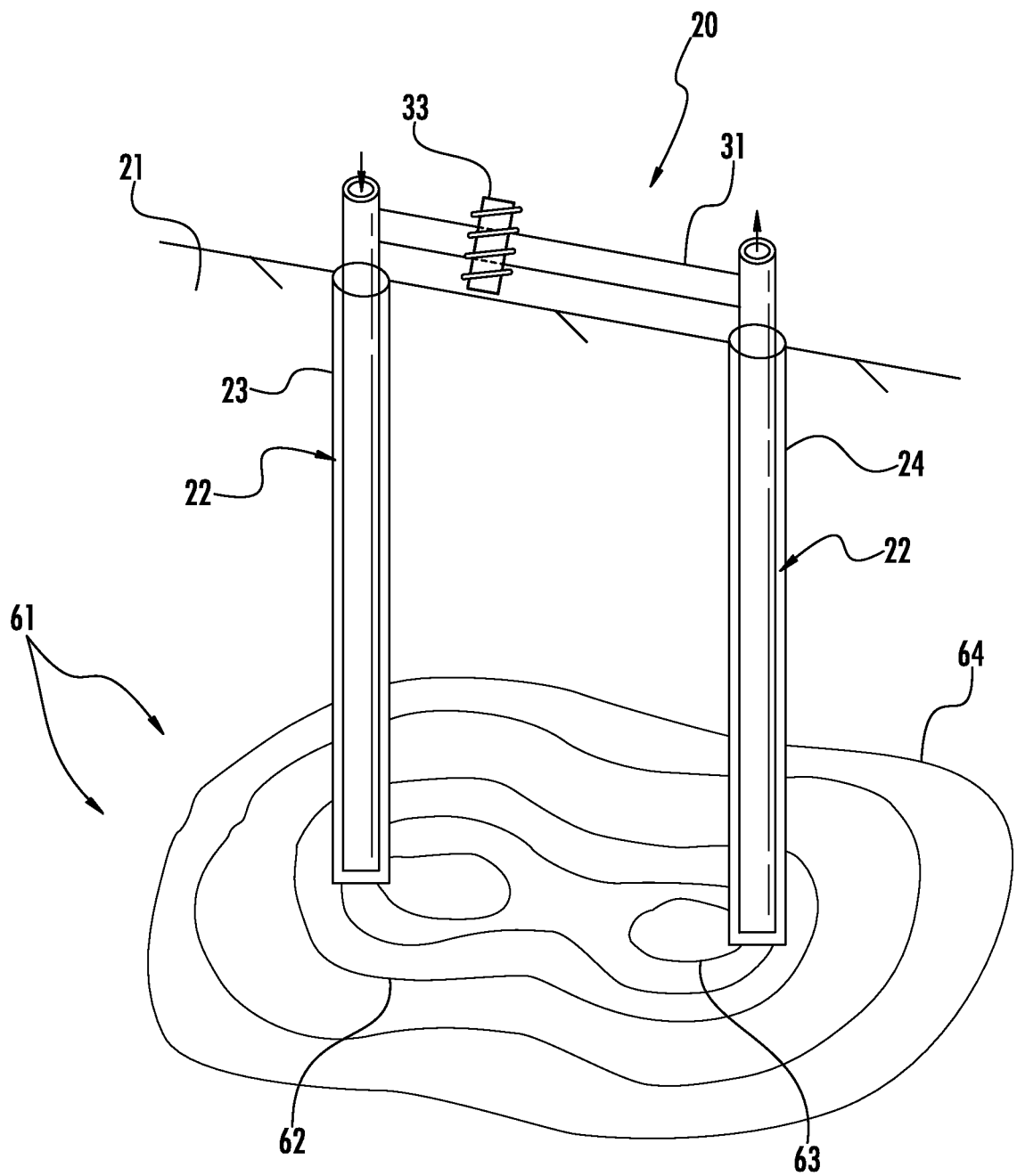
FIG. 9 is a schematic diagram of a portion of the subterranean mapping device of FIG. 1 illustrating magnetic field strength contour.

Referring now additionally to FIG. 9, an isometric view of a portion of the subterranean mapping system 20 showing contour plots 61 of simulated realized magnetic field strength, in a plane between the ends of spaced apart electrically conductive well pipes 22 is illustrated. One watt was applied to the transformer 33 at a radio frequency of 100 hertz. The well pipes 22 were simulated to be 100 meters long. The subterranean formation 21 was typical of a shallow hydrocarbon formation in the Athabasca region of Canada. A first contour line 62 is $1.2 \times 10^{-10}$ amperes/meter, a second contour line 63 is $1.5 \times 10^{-10}$ amperes/meter, and a third contour line 64 is $6.0 \times 10^{-11}$ amperes/meter. Of course, contours also exist for the electric fields, but are not shown, and yet another set of electric and magnetic field contours exist for excitation using an electrically conductive winding (also not shown). As can be appreciated by those skilled in the art, the well pipes 22 provide in-situ antennas to create electric and magnetic fields relatively deep underground. A unique electromagnetic solution set exists for each point in space in the subterranean formation 21.

Many modifications and other embodiments of the invention will also come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A subterranean mapping system comprising:
   a pair of spaced electrically conductive well pipes in a subterranean formation containing a hydrocarbon resource, the pair of electrically conductive well pipes comprising a fluid inlet pipe and a fluid outlet pipe;
   a radiofrequency (RF) source coupled to said pair of electrically conductive well pipes and configured to generate an electromagnetic (EM) field in the subterranean formation; and
   a subterranean mapping device configured to be carried along with a fluid flow along a path of travel from said fluid inlet pipe to said fluid outlet pipe and while sensing the EM field versus time.

2. The subterranean mapping system of claim 1, further comprising a controller configured to be coupled to said subterranean mapping device and configured to map the path of travel based upon the sensed EM field.

3. The subterranean mapping system of claim 1, wherein said subterranean mapping device comprises:
   a portable housing;
   a plurality of antennas carried by said portable housing;
   a receiver coupled to said plurality of antennas and configured to sense a plurality of phase and amplitude components of the EM field; and
   a memory coupled to said receiver and configured to store the plurality of phase and amplitude components.

4. The subterranean mapping system of claim 1, wherein said RF source comprises:
   a shunt coupled between the pair of electrically conductive well pipes; and
   an RF generator coupled to said shunt.

5. The subterranean mapping system of claim 4, wherein said shunt comprises an electrically conductive and magnetic material.

6. The subterranean mapping system of claim 4, further comprising a transformer coupled between said RF generator and said shunt.

7. The subterranean mapping system of claim 4, further comprising an electrically conductive winding coupled between said RF generator and said shunt.

8. The subterranean mapping system of claim 1, wherein said RF source is above the subterranean formation.

9. A subterranean mapping system comprising:
   a pair of spaced electrically conductive well pipes in a subterranean formation containing a hydrocarbon resource, the pair of electrically conductive well pipes comprising a fluid inlet pipe and a fluid outlet pipe;

a radiofrequency (RF) source coupled to said pair of electrically conductive well pipes and configured to generate an electromagnetic (EM) field in the subterranean formation, and comprising
  a shunt coupled between said pair of electrically conductive well pipes, and
  an RF generator coupled to said shunt;

a subterranean mapping device configured to be carried along with a fluid flow along a path of travel from said fluid inlet pipe to said fluid outlet pipe and while sensing the EM field versus time; and a controller to be coupled to said subterranean mapping device and configured to map the path of travel based upon the sensed EM field.

10. The subterranean mapping system of claim 9, wherein said subterranean mapping device comprises:
  a portable housing;
  a plurality of antennas carried by said portable housing;
  a receiver coupled to said plurality of antennas and configured to sense a plurality of phase and amplitude components of the EM field; and
  a memory coupled to said receiver and configured to store the plurality of phase and amplitude components.

11. The subterranean mapping system of claim 9, wherein said shunt comprises an electrically conductive and magnetic material.

12. The subterranean mapping system of claim 9, further comprising a transformer coupled between said RF generator and said shunt.

13. The subterranean mapping system of claim 9, further comprising an electrically conductive winding coupled between said RF generator and said shunt.

14. The subterranean mapping system of claim 9, wherein said RF source is above the subterranean formation.

15. A method of a mapping a path of travel of a subterranean mapping device in a subterranean formation containing a hydrocarbon resource and having a pair of spaced electrically conductive well pipes therein, the pair of electrically conductive well pipes comprising a fluid inlet pipe and a fluid outlet pipe, the method comprising:
  supplying radiofrequency (RF) energy from an RF source coupled to the pair of electrically conductive well pipes to generate an electromagnetic (EM) field in the subterranean formation; and
  advancing the subterranean mapping device along with a fluid flow along the path of travel from the fluid inlet pipe to the fluid outlet pipe and while sensing the EM field versus time.

16. The method of claim 15, further comprising coupling a controller to the subterranean mapping device to map the path of travel based upon the sensed EM field.

17. The method of claim 15, wherein advancing a subterranean mapping device comprises advancing a subterranean mapping device comprising a portable housing, a plurality of antennas carried by the portable housing, a receiver coupled to the plurality of antennas and configured to sense a plurality of phase and amplitude components of the EM field, and a memory coupled to the receiver and configured to store the plurality of phase and amplitude components.

18. The method of claim 15, wherein supplying RF energy comprises supplying RF energy from an RF source comprising a shunt coupled between the pair of electrically conductive well pipes and an RF generator coupled to the shunt.

19. The method of claim 18, wherein supplying RF energy from an RF source comprising a shunt comprises supplying RF energy to a shunt comprising an electrically conductive and magnetic material.

20. The method of claim 15, wherein supplying RF energy from the RF source comprises supplying RF energy from an RF source above the subterranean formation.

* * * * *